United States Patent
Amigot et al.

(10) Patent No.: US 8,337,115 B2
(45) Date of Patent: Dec. 25, 2012

(54) PAVING STONE AND METHOD FOR THE PRODUCTION THEREOF

(75) Inventors: Jose Luis Moracho Amigot, Tudela (ES); Angel Moracho Jimenez, Tudela (ES)

(73) Assignee: Pavimentos de Tudela, S.L., Tudela (Navarra) (ES)

( * ) Notice: Subject to any disclaimer, the term of this patent is extended or adjusted under 35 U.S.C. 154(b) by 0 days.

(21) Appl. No.: 13/133,661

(22) PCT Filed: Dec. 9, 2009

(86) PCT No.: PCT/ES2009/000564
§ 371 (c)(1), (2), (4) Date: Aug. 5, 2011

(87) PCT Pub. No.: WO2010/066920
PCT Pub. Date: Jun. 17, 2010

(65) Prior Publication Data
US 2011/0286794 A1    Nov. 24, 2011

(30) Foreign Application Priority Data

Dec. 10, 2008   (ES) .................................. 200803491
Nov. 30, 2009   (ES) .................................. 200902258

(51) Int. Cl.
*E01C 5/06* (2006.01)
(52) U.S. Cl. .............................. 404/34; 404/36; 52/596
(58) Field of Classification Search .............. 404/34–36; 52/596
See application file for complete search history.

(56) References Cited

U.S. PATENT DOCUMENTS

| | | | | |
|---|---|---|---|---|
| 4,790,544 A | * | 12/1988 | Kemp | 277/314 |
| 4,802,836 A | * | 2/1989 | Whissell | 425/253 |
| 5,861,205 A | * | 1/1999 | Murata et al. | 428/141 |
| 5,902,528 A | * | 5/1999 | Spragg | 264/42 |
| 6,454,489 B1 | * | 9/2002 | Murata et al. | 404/17 |
| 6,627,315 B2 | * | 9/2003 | Sakai | 428/406 |
| 6,886,304 B1 | * | 5/2005 | Godi et al. | 52/612 |
| 7,819,607 B2 | * | 10/2010 | Carreras-Maldonado et al. | 404/34 |
| 8,039,100 B2 | * | 10/2011 | Cucitore et al. | 428/323 |
| 8,092,586 B2 | * | 1/2012 | Ancora et al. | 106/416 |
| 2005/0166518 A1 | * | 8/2005 | Van Cauwenbergh | 52/596 |
| 2009/0272296 A1 | * | 11/2009 | Tontrup et al. | 106/436 |

FOREIGN PATENT DOCUMENTS

| | | |
|---|---|---|
| CN | 101205697 | 6/2008 |
| EP | 0 786 283 | 7/1997 |
| EP | 1 020 564 | 7/2000 |
| JP | 8-253355 | 10/1996 |
| JP | 2002-3283 | 1/2002 |

OTHER PUBLICATIONS

International Search Report dated May 6, 2010 from corresponding International Application No. PCT/ES2009/000564.

Hui-Chi Huang, et al. "Immobilization of TiO2 nanoparticles on Fe-filled carbon nanocapsules for photocatalytic applications" Thin Solid Films, vol. 515 (2006) 1033-1037.

* cited by examiner

*Primary Examiner* — Raymond W Addie
(74) *Attorney, Agent, or Firm* — Katten Muchin Rosenman LLP

(57) ABSTRACT

The paving stone (1) which can degrade environmental pollutant elements or gases, comprising a body provided with two layers, a first surface layer (2) and a second base layer (3) which are solidly overlapped, where said surface layer (2) comprises a solidified paste including cement, silica sand, titanium dioxide, zeolite and ferric oxides or $FeO_2$, marble pebbles and recycled materials, while the base layer (3) comprises a solidified paste including cement, preferably grey, aggregate particles and recycled materials, and a method for producing said stone (1) in a continuous process.

19 Claims, 3 Drawing Sheets

PAVING STONE AND METHOD FOR THE PRODUCTION THEREOF

OBJECT OF THE INVENTION

The object of the present invention Patent Application is to register a paving stone which incorporates considerable innovations and advantages compared to other stones with same purpose as well as the method for producing said stone.

More specifically, the invention relates to a stone for outdoor sites manufactured from, among others, recycled materials which is able to degrade polluting elements efficiently and without the need for additional equipment.

The essential characteristic of the stone object of the present invention is that it has a surface layer which comprises at least one catalyst selected from the group formed by doped titanium dioxide, ferric oxides, $FeO_2$ and zeolite or combinations thereof so as to achieve a high decontaminating efficiency to degrade organic compounds, preferably volatile organic compounds and more preferably nitrogen oxides (referred to in the present invention as NOx) besides purifying the air.

BACKGROUND OF THE INVENTION

Other attempts to obtain paving with ecological properties are well known in the art; these consist of absorbing or degrading part of the polluting elements or compounds found in the environment, such as, for example, gases from the combustion engines of motor vehicles, through the surface of the paving.

However, it has been observed that said known paving has a high cost which has a negative influence on the decision to use this paving or not, despite providing an advantageous ecological aspect, due to the cost of the raw materials needed to obtain the paving.

Furthermore, the applicant is unaware of the existence of a stone which possesses the characteristics described in this specification, and particularly, which uses materials that are pre-used and used again later, which we will call recycling or recycled materials.

DETAILED DESCRIPTION OF THE INVENTION

The present invention has been developed so as to provide an ecological stone that resolves the previously mentioned drawbacks, further providing other additional advantages which will become evident from the following description.

As mentioned in the previous section, the stone object of the present invention has been developed so as to provide a greater degree of efficiency in the degradation of pollutants, besides providing other additional advantages such as low manufacturing cost compared to the prior art, not just because it uses a low proportion of doped titanium dioxide but also because it uses materials previously used and therefore recycled so reduces costs for producing the two layers of the stone herein described, thus, the ecological and environmental characteristic advantage is provided by its capacity to decompose and degrade the compounds that make up certain polluting gases by a process known as photocatalysis thanks to the presence of catalysts which have good durability and resistance properties appropriate for the intended use.

For the object of the present invention, the ecological stone—also called stone (1)—object of the present invention, which comprises a body provided with two layers, a first surface layer—also called surface layer (2)—and a second base layer—also called base layer (3)—which are solidly overlapped, completely and satisfactorily resolves the aforementioned problems, in all mentioned aspects, through the incorporation of at least one catalyst selected from the group formed by: doped titanium dioxide, ferric oxides, $FeO_2$ and zeolites or combinations thereof in the surface layer (2) which makes it possible to obtain a high decontaminating efficiency as well as the degradation of organic compounds, preferably volatile organic compounds and more preferably nitrogen oxides or NOx besides purifying air.

Preferably, and according to the object of the present invention, when the stone (1) comprises the combination of the doped $TiO_2$ catalyst with zeolite and ferric oxides or $FeO_2$ it manages to decompose and degrade a greater quantity of the compounds which make up the polluting gases thanks to the combination of two processes: a process known as heterogeneous photocatalysis (thanks to the doped $TiO_2$ as a catalyst) combined with another process known as homogeneous photocatalysis (thanks to the presence of zeolite and ferric oxides as an additional catalyst) to decompose and degrade a greater quantity of organic compounds and purify the air to a higher degree than that obtained by using only doped $TiO_2$. Furthermore, being in contact with zeolite considerably increases the level of OH radicals generated, which results in a substantial improvement in the method and consequently the stone (1) as well as its technical characteristics.

In accordance with the present invention, and preferably, it consists of using, whether combined or not, two photocatalysis methods. It thus maximizes the generation of highly oxidizing species (such as hydroxyl radicals, $OH^-$) which can be generated through two advanced oxidation processes (used alone or together) that are capable of using solar radiation which for the present invention are of special interest since the energy cost would be zero given that the sun would provide the needed radiation.

These two processes are heterogeneous photocatalysis and the photo-Fenton processes. The first of them is based on the action of a semiconductor (doped $TiO_2$) found in suspension and which generates hydroxyl radicals through reactions wherein water and oxygen are essential. And the second one is based on the use of Fenton's reagent (described by H. J. H. Fenton in the late nineteenth century) which is based on generating hydroxyl radicals in the presence of hydrogen peroxide and ferrous ions ($Fe^{+2}$) in an acidic pH and at moderate temperatures; the action of this reagent is significantly increased by introducing UV-Visible radiation causing the photo-Fenton process. The photo-Fenton processes have a higher light sensitivity than heterogeneous photocatalysis processes which means a greater use of the solar energy.

In this case, the processes can be used independently or combined, displaying a synergistic effect in the second case, since a greater amount of hydroxyl radicals are obtained, resulting in a greater decontaminating efficiency of the stone (1).

For the object of the present invention, so as to illustrate but not limiting, the formation of oxidizing radicals takes place through the following reactions:

$$TiO_2 \rightarrow H^+ E^-$$

$$H + OH \rightarrow OH$$

$$E^- + O_2 \rightarrow O_2$$

wherein $H^-$ and $E^-$ are the gaps generated in the semiconductor upon adsorbing the UV radiation and the OH radicals are those with a strong oxidizing power only exceeded by fluorine.

Using another catalyst—ferric oxides or $FeO_2$ (photo-Fenton)—can also generate the OH radicals when $FeO_2$ reacts with $H_2O$ and $Fe_3$ generated in the presence of UV light can also produce these same OH radicals. Thus the photo-Fenton reaction is caused by catalyzing the hydrogen peroxide with iron, resulting in the generation of highly reactive hydroxyl radicals (OH).

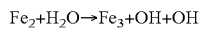

$Fe_2 + H_2O \rightarrow Fe_3 + OH + OH$

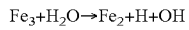

$Fe_3 + H_2O \rightarrow Fe_2 + H + OH$

Thus, for example the combination of iron oxide as ferrous salt ($FeO_2$) in a surface of zeolites or silica sand as $H_2O$ containers due to its porous cage structure will produce OH radicals that, when used together, will complement those generated by the photocatalytic process used when the catalyst is $TiO_2$.

For the object of the present invention, "ferric oxides" are understood to be the iron oxide chemical compounds formed by iron and oxygen and selected in non-limiting manner, from the group formed by: ferrous oxide (FeO), ferric oxide ($Fe_2O_3$) and ferric ferrous oxide ($Fe_3O_4$), and all their combinations.

For the object of the present invention, "$FeO_2$" refers to the compound with said chemical formula generated by a process known as "photo-Fenton process".

For the object of the present invention, the "photo-Fenton process" refers to the process of advanced oxidation which consists of using systems based on generating highly oxidizing species (such as hydroxyl radicals, $OH^-$) by using Fenton's reagent (described by H. J. H. Fenton in the late nineteenth century) which is based on the generation of hydroxyl radicals in the presence of hydrogen peroxide and ferrous ions ($Fe^{+2}$) in an acidic pH and at moderate temperatures and which results in hydrogen peroxide dissolved in ferrous salt.

For the object of the present invention, "zeolite" refers to a set of minerals which comprise hydrated aluminium silicates of alkaline and alkaline-earth metals. More specifically, aluminosilicates with cavities of molecular dimensions ranging from 8 to 10 Angstrom which contain large ions and water molecules which are free to move, so as to allow ion exchange.

Therefore, the essential technical effect of the improved invention is to generate many more radicals to achieve a much greater decontaminating efficiency, not only of the compounds which make up polluting gases but also of other organic compounds thus purifying the air to a greater extent.

For the object of the present invention the individual values of the percentages of the different components of the stone (1) are such that the total composition never exceeds 100%.

Therefore, it is an object of the present invention to provide a stone (1) for outdoor sites manufactured from, among others, recycled materials, which is capable of degrading pollutants efficiently and without the need to use additional equipment thanks to fact that the paving stone (1) comprises a body provided with two layers, a first surface layer (2) and a second base layer (3) which are solidly overlapped, where the surface layer (2) comprises a solidified paste including cement, silica sand, titanium dioxide, marble pebbles and recycled materials wherein the titanium dioxide is doped and ranges from 0.5 to 5% by total weight of the dried batch and wherein the maximum thickness of the surface layer (2) is equal to or less than 12 mm and the base layer (3) comprises a solidified paste including cement, preferably grey, aggregate particles and recycled materials.

Preferably, the surface layer (2) also comprises zeolite and/or ferric oxides or $FeO_2$.

Preferably, ferric oxides or $FeO_2$ are in a proportion of 0% to 10% by weight as a catalyst and the zeolite in a proportion of 0 to 10% by weight.

Advantageously, the surface layer (2) includes pigments, such as, for example, iron oxide, in a proportion of, for example, 0.30% by weight which provides a shade of colour to the whole stone.

According to another aspect of the invention, the recycled materials in the surface layer (2) comprise glass, ceramic particles and concrete. Preferably, the glass is comprised in a range of between 1% and 15% by weight with respect to the total weight of the surface layer, and more preferably between 1.5% and 12% by weight.

The base layer (3) can have a thickness between 10 mm and 150 mm, more preferably between 10 mm and 80 mm. The base layer (3) can preferably have a thickness between 35 mm and 80 mm, more preferably between 38 mm and 68 mm.

The base layer (3) of the stone comprises a solidified paste including cement, preferably grey, aggregate particles and recycled materials.

Furthermore, the base layer (3) can also include a water repellent which is comprised in a range of between 0.15 and 0.30% which acts as a reductant for water filtration, being more preferably between 0.20 and 0.28%, as well as a fluidizing additive which is comprised in a range of between 0.15 and 0.30%, more preferably between 0.20 and 0.28%, which allows reducing the quantity of water required in the manufacturing process of the stone.

More particularly, the aggregate particles provided in the base layer (3) have a granulometry of 0.1 to 5 mm in a proportion of between 0 and 65% by weight with respect to the total weight of the base layer. The aggregate particles preferably have a thickness of 0.1 to 1 mm in a proportion of between 1 and 20% by weight with respect to the total weight of the base layer.

The aggregate particles preferably have a granulometry of 0.1 to 5 mm in a proportion of 0 and 47% by weight with respect to the total weight while also providing siliceous aggregate particles with a granulometry of 0.1 to 1 mm and in a proportion of between 15 and 20% by weight with respect to the total weight.

The aggregate particles provided in the base layer (3) of recycled material can have a granulometry of 0.1 mm and 8 mm in a proportion of 10% by weight. Preferably, the recycled materials in the base layer (3) comprise aggregate materials in a proportion comprised between 1% and 12% by weight with respect to the total weight of the base layer.

The aggregate particles provided in the base layer (3) can be river sands of 0.1 mm to 6 mm of 10% by weight with respect to the total weight of the base layer.

Thanks to these characteristics, an ecological stone (1) is produced with a high decontaminating power to be placed in outdoor areas, which has a low manufacturing cost with regards to the prior art, not just because of the low proportion of titanium dioxide but also because it uses recycled materials so that the costs for obtaining both layers of the stone described are reduced. The ecological and environmental characteristic is provided by the capacity to decompose and degrade the compounds that make up polluting gases by a process known as heterogeneous photocatalysis (with doped $TiO_2$) combined or not with a process of homogenous photocatalysis (with ferric oxides or $FeO_2$ and zeolite) also maintaining good resistance and durability properties appropriate for its intended use.

Furthermore, another advantageous aspect of the invention is the fact that using recycled materials reduces the number of manufacturing and transformation processes of the elements that make up the stone, thus reducing $CO_2$ emissions into the atmosphere.

Details regarding the photocatalysis process beyond what has been previously described are not going to be provided since it is a process well-known by any person skilled in the art.

For the object of the present invention, recycled materials refer to those particles which have previously been a part of other manufactured pieces and stones and that have later been crushed.

Another object of the present invention is to provide a process for producing a paving stone such as the one previously described, which comprises a first stage of pouring a semi-dry mixture into a mould and later a second pouring stage of a second semi-dry mixture overlapped over the first one in said mould, after which a vibrating and compacting stage of both mixtures takes place and later a demoulding stage of the produced product.

Each of the first and second mixtures is carried out through a corresponding concrete mixer while the vibrating can be carried out by means of an electrical vibrating device.

The details, shapes, dimensions and other accessory elements, as well as the materials used in the manufacture of the stone of the invention can be conveniently replaced by others which are technically equivalent and do not differ from the essence of the invention or the scope defined by the claims hereinafter included.

The following embodiments are included with illustrating but non-limiting character:

Ecological Stone with Doped $TiO_2$:

According to an embodiment of the invention, the paving stone is formed from a body with a considerably parallelepiped shape, for example with dimensions on plan of 20×10, and generally referred to as (1), although said shape should not be considered limiting, having a first surface layer (2) with a thickness of approximately between 7 and 12 mm and a second base layer (3) with a thickness of approximately 50 mm which are overlapped. This stone is appropriate for covering playgrounds, city or town squares or streets, where the surface layer (2) is oriented outwards while the base layer (3) is concealed and in contact with the ground.

For the object of the present example, the individual values of the percentages indicated therein are such that the total of the composition never exceeds 100%.

With regards to the first surface layer (2), it comprises a solidified paste including cement which can be white or grey in a proportion of 0% to 19% by weight, silica sand in a proportion of 0% to 43% by weight with a granulometry of between 0.1 and 1 mm, doped titanium dioxide in a proportion of 0% to 5% by weight, marble pebbles in a proportion of 0% to 16% by weight, plasticizer in a proportion of 0% to 0.33% by weight. It is also provided with recycled materials, such as recycled glass with a granulometry of 0.1 mm to 2 mm in a percentage of 0% to 10% by weight as well as recycled sand of 0.1 mm to 8 mm in a maximum percentage of a 10% by weight. The presence of this recycled glass widens the solar projection so it facilitates the photocatalysis process in the stone (1) while the sand improves the humidity absorption property without loosing the required resistance.

On the other hand, regarding the base layer (3) of the stone, it comprises a solidified paste including cement, preferably grey, aggregate particles and recycled materials. The aggregate particles or materials are in a proportion comprised between 0% and 12% by weight with respect to the total weight of the base layer (3), also including a water repellent which is comprised in a range preferably between 0.20 and 0.28% by weight.

The recycled materials in the base layer (3) comprise aggregate materials in a proportion comprised between 0% and 12% by weight with respect to the total weight of the layer.

Therefore, there is no doubt regarding the ecological and environmental characteristics that the stone (1) of the invention provides, since besides capturing atmospheric pollution, it enables the satisfactory reuse of those particles from the field of ceramics and paving which have thus far been wasted. Another aspect that is no less important is the fact that the kind of stone described can be discarded and later ground so that its remains can be used to obtain a new stone.

Ecological Stone with Ferric Oxides or $FeO_2$ and Zeolite:

According to an embodiment of the invention, the paving stone is formed by a body with a considerable parallelepiped shape, for example, with dimensions on plan of 20×10, and generally referenced with 1, although said shape must not be considered limiting, it presents a first surface layer 2 with a thickness of approximately between 7 and 12 mm and a second base layer 3 with a thickness of approximately 50 m which are overlapped. This stone is appropriate for covering playgrounds, city or town squares or streets, where the surface layer 2 is facing outwards while the base layer 3 remains concealed and in contact with the ground.

For the object of the present example, the individual values of the indicated percentages in it are such that the total composition never exceeds 100%.

With regards to the first surface layer (2), it comprises a solidified paste including cement which can be white or grey in a proportion of between 0% and 19% by weight, silica sand in a proportion of 0% and 43% by weight with a granulometry of between 0.1 and 1 mm, ferric oxides or $FeO_2$ in a proportion of between 0% and 10% by weight and zeolite in a proportion of 0 to 10% by weight, marble pebbles in a proportion of 0% to 16% by weight, plasticizer in a proportion of 0% to 0.43% by weight. It is also provided with recycled materials, such as recycled glass with a granulometry of 0.1 mm to 2 mm in a percentage of 0% to 10% by weight as well as recycled sand of 0.1 mm to 8 mm in a maximum percentage of a 10% by weight. The presence of this recycled glass widens the solar projection so it facilitates the photocatalysis process in stone (1) while the sand improves the humidity absorption property without loosing the required resistance.

On the other hand, regarding the base layer (3) of the stone, it comprises a solidified paste including cement, preferably grey, aggregate particles and recycled materials. The aggregate particles or materials are in a proportion comprised between 0% and 12% by weight with respect to the total weight of the base layer (3), also including a water repellent which is comprised in a range preferably between 0.20 and 0.28% by weight.

The recycled materials in the base layer (3) comprise aggregate materials in a proportion comprised between 0% and 12% by weight with respect to the total weight of the layer.

Therefore, there is no doubt regarding the ecological and environmental characteristics that the stone (1) of the invention provides, since besides capturing atmospheric pollution, it enables the satisfactory reuse of those particles from the field of ceramics and paving which have thus far been wasted. Another aspect that is no less important is the fact that the kind of stone described can be discarded and later ground so that its remains can be used to obtain a new stone.

Ecological Stone with Doped $TiO_2$, Ferric Oxides or $FeO_2$ and Zeolite

According to an embodiment of the invention, the paving stone is formed by a body with a considerable parallelepiped shape, for example, with dimensions on plan of 20×10, and generally referred to as 1, although said shape must not be considered limiting, it has a first surface layer 2 with a thickness of approximately between 7 and 12 mm and a second base layer 3 with a thickness of approximately 50 m which are overlapped. This stone is appropriate for covering playgrounds, city or town squares or streets, where the surface layer 2 is facing outwards while the base layer 3 remains concealed and in contact with the ground.

For the object of the present example, the individual values of the indicated percentages in it are such that the total composition never exceeds 100%.

With regards to the first surface layer (2), it comprises a solidified paste including cement which can be white or grey in a proportion of between 0% and 19% by weight, silica sand in a proportion of 0% and 33% by weight with a granulometry of between 0.1 and 1 mm, doped titanium dioxide in a proportion of 0% to 5% by weight, ferric oxides or $FeO_2$ in a proportion of between 0% and 10% by weight and zeolite in a proportion of 0 to 10% by weight, marble pebbles in a proportion of 0% to 16% by weight, plasticizer in a proportion of 0% to 0.33% by weight. It is also provided with recycled materials, such as recycled glass with a granulometry of 0.1 mm to 2 mm in a percentage of 0% to 10% by weight as well as recycled sand of 0.1 mm to 8 mm in a maximum percentage of a 10% by weight. The presence of this recycled glass widens the solar projection so it facilitates the photocatalysis process in stone (1) while the sand improves the humidity absorption property without loosing the required resistance.

On the other hand, regarding the base layer (3) of the stone, it comprises a solidified paste including cement, preferably grey, aggregate particles and recycled materials. The aggregate particles or materials are in a proportion comprised between 0% and 12% by weight with respect to the total weight of the base layer (3), also including a water repellent which is comprised in a range preferably between 0.20 and 0.28% by weight.

The recycled materials in the base layer (3) comprise aggregate materials in a proportion comprised between 0% and 12% by weight with respect to the total weight of the layer.

Therefore, there is no doubt regarding the ecological and environmental characteristics that the stone (1) of the invention provides, since besides capturing atmospheric pollution, it enables the satisfactory reuse of those particles from the field of ceramics and paving which have thus far been wasted. Another aspect that is no less important is the fact that the kind of stone described can be discarded and later ground so that its remains can be used to obtain a new stone.

In detail, the method of obtaining stone (1) whether the catalyst is $TiO_2$ by itself or combined with ferric oxides or $FeO_2$ and/or zeolite, is as follows:

First, an initial pouring stage (10) of a semi-dry mixture contained in a conventional cement mixer into a mould with the desired shape for the surface layer is carried out. Next, in a second pouring stage (20) a second mixture, corresponding to the base layer, is poured, also in a semi-dry state and likewise contained in a cement mixer, such that it overlaps the first mixture in said mould movable by mechanical means, after which a vibrating stage (30) is carried out by means of electrically fed mechanical vibrators, known in the state of the art, particularly two vibrators, and compacting the mixture of both pourings by means of a hydraulic mixture of a known type so that we will not into further details regarding their explanation.

Last, a demoulding stage (40) takes place where the obtained piece, i.e. the stone (1) is extracted from the mould so as to finally be cooled at room temperature until it completely solidifies and is ready to be installed or placed outdoors.

The cement mixers are connected to hoppers (not represented) provided with the elements to be mixed in the corresponding cement mixers, where the materials are transported from the cement mixers by means of a conveyor belt.

The previous operations and stages are controlled and governed by control means, such as a computer, in charge of indicating the time and quantity by weight to be deposited in each of the corresponding stages, so that each method is carried out automatically and in chain so that whilst one mould is demoulded another mould is being filled with the mixtures and so on and so forth.

The details, shapes, dimensions and other accessory elements, as well as the materials used in the manufacture of the stone of the invention can be conveniently replaced by others which are technically equivalent and which do not differ from the essence of the invention or the scope defined by the claims hereinafter included.

EXAMPLES

The following specific examples provided here serve to illustrate the nature of the present invention. These examples are included solely for illustrative purposes and should not be interpreted as limitations of the invention herein claimed.

Example

Elimination of Nitric Oxide (NOx) Using an Ecological Stone (1) with Doped $TiO_2$, Ferric Oxides or $FeO_2$ and/or Zeolite.

The experiments were carried out according to ISO standard 22197-1:2007 for eliminating nitric oxide (NO) which included a pretreatment of the sample (eliminating organic matter and washing with water) and the pollutant elimination test of a stone (1) with an active surface of 49.5 mm in width and 99.5 mm in length with three variants:
a) ecological stone (1) with doped $TiO_2$,
b) ecological stone (1) with $FeO_2$ and zeolite,
c) ecological stone (1) with doped $TiO_2$, ferric oxides or $FeO2$ and zeolite.

The photocatalytic pollutant elimination test was carried out in a reactor during approximately 8 hours because the samples had to be photo-irradiated during 5 hours. The NO concentration entry was stabilized during the 20 minutes previous to the starting point of the experiments. Later, the reactor's circulation valve was opened allowing the test gas to flow in the photoreactor. In parallel, the same method was performed with a control sample in complete absence of photo-irradiation was carried out. After 30 minutes, the sample was irradiated during 5 hours. Finally, the pollutant source was stopped and UV radiation was switched off, and the NOx concentration was recorded during 30 minutes. During the total time of the experiments, the laboratory temperature was 20.0° C.±1.5° C. and the relative humidity was determined to be 50%±2%.

Figure 1:
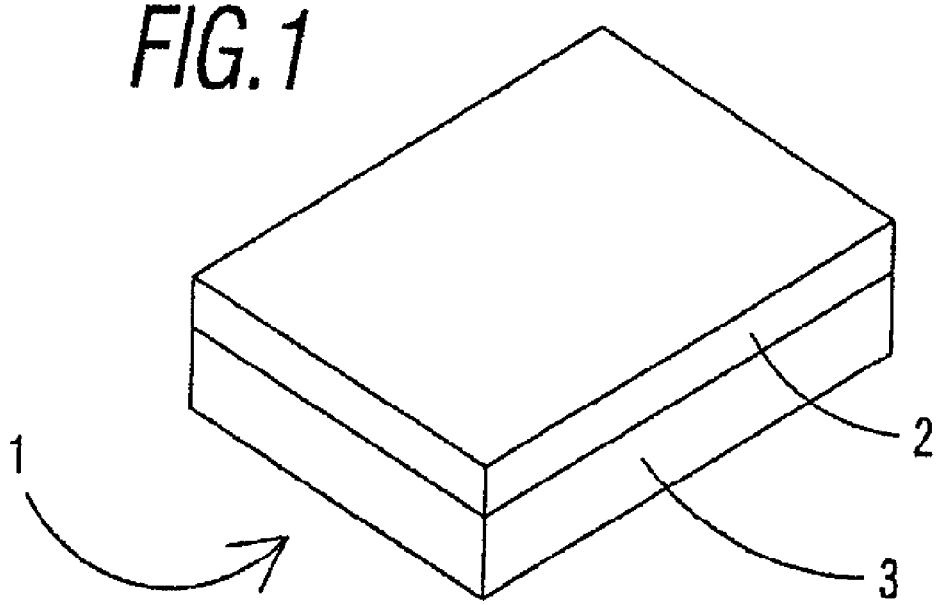
FIG. 1.—It is a perspective schematic view of a paving stone according to the present invention.
Figure 2:
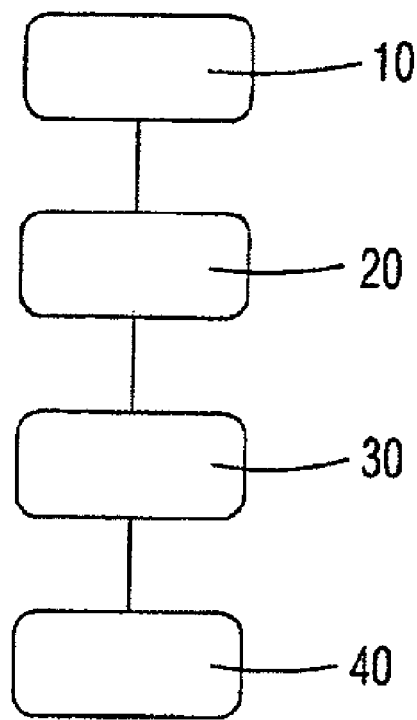
FIG. 2.—It is a block diagram corresponding to the manufacturing process of a stone according to the invention.
Figure 3:
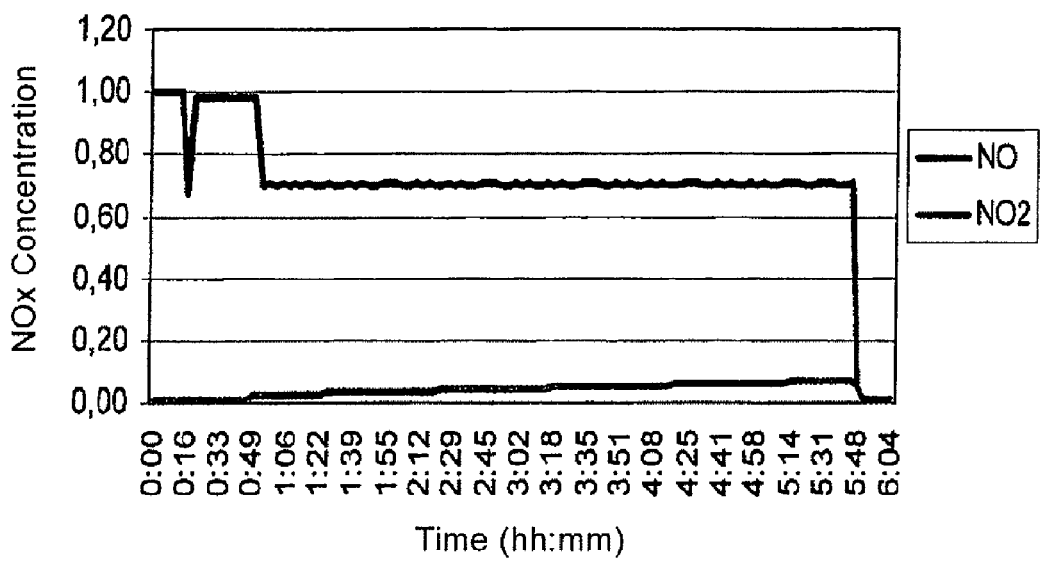
FIG. 3.—It is a graph which represents the photocatalytic activity for the elimination of NOx with a low $NO_2$ generation according to the test method established by ISO standard 22197-1:2007 with a stone (1) wherein the catalyst is $TiO_2$. This figure represents, according to the calculation method of ISO standard 22197-1:2007, the quantity of NOx adsorbed by the sample ($n_{ads}$), the quantity of NO eliminated ($n_{NO}$), the quantity of $NO_2$ generated ($n_{NO2}$), the quantity of NOx expelled ($n_{des}$) and the net amount of NOx eliminated from the sample ($n_{NOx}$). This figure shows the graph of NO and $NO_2$ concentration during the sample pollutant elimination operation, showing a NOx degradation of 32%.
Figure 4:
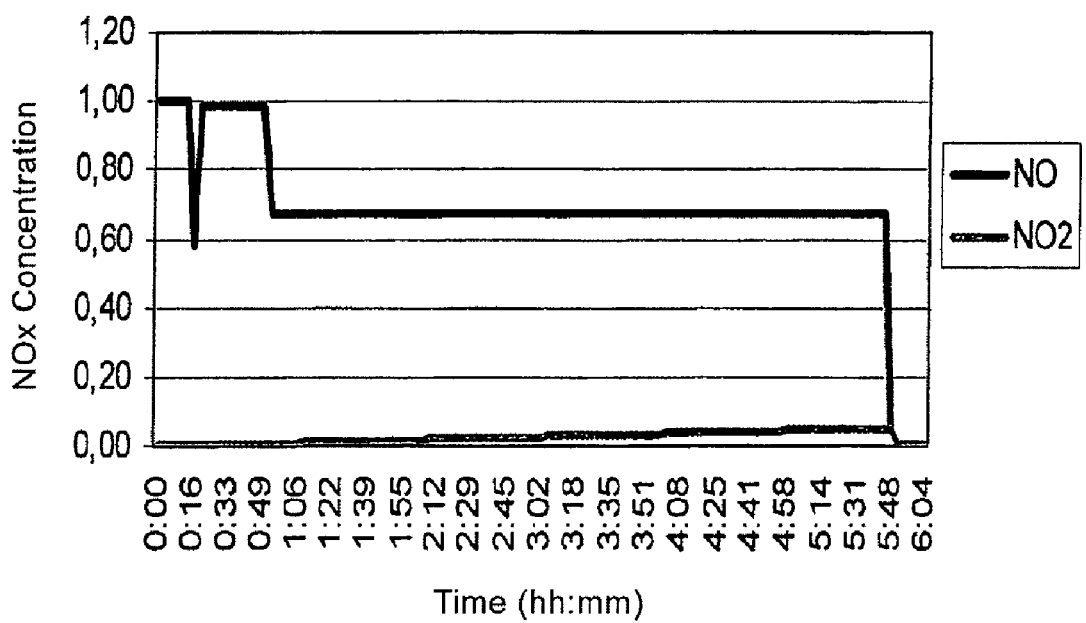
FIG. 4.—It is a graph which represents the photocatalytic activity for the elimination of NOx with a low generation of $NO_2$ according to the test method established by ISO standard 22197-1:2007 with a stone (1) wherein the catalyst is $FeO_2$ and zeolite. This figure represents, according to the calculation method of ISO standard 22197-1:2007, the quantity of NOx adsorbed by the sample ($n_{ads}$), the quantity of NO eliminated ($n_{NO}$), the quantity of $NO_2$ generated ($n_{NO2}$), the quantity of NOx expelled ($n_{des}$) and the net amount of NOx eliminated from the sample ($n_{NOx}$). This figure shows the graph of NO and $NO_2$ concentration in the sample during the sample pollutant elimination operation, showing a NOx degradation of 34%.
Figure 5:
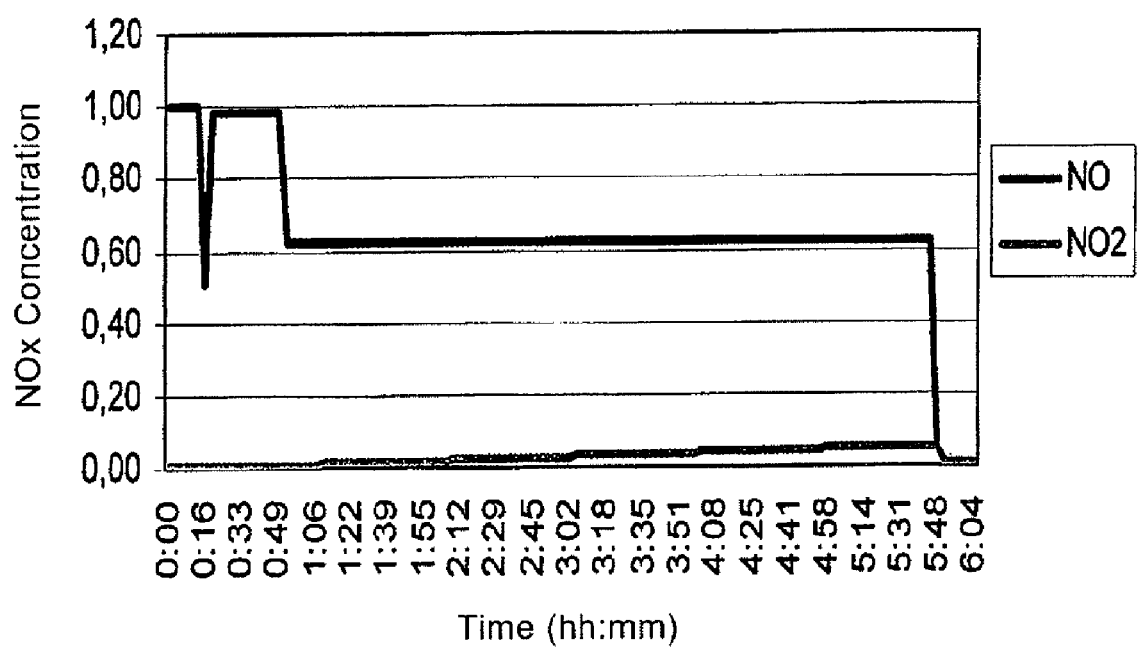
FIG. 5.—It is a graph which represents the photocatalytic activity for the elimination of NOx with a low generation of $NO_2$ according to the test method established by ISO standard 22197-1:2007 with a stone (1) wherein the catalyst is $TiO_2$, $FeO_2$ and zeolite. This figure represents, according to the calculation method of ISO standard 22197-1:2007, the quantity of NOx adsorbed by the sample ($n_{ads}$), the quantity of NO eliminated ($n_{NO}$), the quantity of $NO_2$ generated ($n_{NO2}$), the quantity of NOx expelled ($n_{des}$) and the net amount of NOx eliminated from the sample ($n_{NOx}$). This figure shows the graph of NO and $NO_2$ concentration during the sample pollutant elimination operation, showing a NOx degradation of 38%.

The following table shows the results obtained during the nitric oxide elimination test. According to the ISO standard 22197-1:2007 calculation method the results correspond to the quantity of NOx adsorbed by the sample ($n_{ads}$), the quantity of NO eliminated ($n_{NO}$), the quantity of $NO_2$ generated ($n_{NO2}$), the quantity of NOX expelled ($n_{des}$) and the net amount of NOx eliminated from the sample ($n_{NOx}$). In FIGS. 3 to 5 appear the NO and $NO_2$ concentration graphs during the sample pollutant elimination operations.

TABLE 1

| Experimental results | | | | |
|---|---|---|---|---|
| $n_{ads}$ (µmol) | $n_{NO}$ (µmol) | $n_{NO2}$ (µmol) | $n_{des}$ (µmol) | $n_{NOX}$ (µmol) |
| 1.65 | 152.04 | 16.62 | 2.37 | 134.70 |

The results obtained from the present example show an effectiveness of the stone (1) object of the present invention, in all its variants:
a) ecological stone (1) with doped $TiO_2$: pollutant elimination with a NOx degradation of 32%.
b) ecological stone (1) with $FeO_2$ and zeolite: pollutant elimination with a NOx degradation of 34%.
c) ecological stone (1) with doped $TiO_2$, ferric oxides or $FeO2$ and zeolite: pollutant elimination with a NOx degradation of 38%.

In this way it is observed how, when the photocatalytic processes are combined, more OH radicals are generated and a greater degree of NOx degradation is produced, which leads to a greater decontaminating effect of the stone object of the invention.

The invention claimed is:

1. A paving stone (1) which comprises a body provided with two layers, a first surface layer (2) and a second base layer (3) which are solidly overlapped, where the surface layer (2) comprises a solidified paste including cement, silica sand, titanium dioxide, marble pebbles and recycled materials; where the base layer (3) comprises a solidified paste including cement, aggregate particles and recycled materials, wherein the titanium dioxide is doped and is comprised in a range between 0.5 and 5% by total weight of the dried batch and wherein the maximum thickness of the surface layer (2) is equal to or less than 12 mm.

2. The paving stone (1) according to claim 1, wherein the first surface layer (2) of the stone (1) comprises ferric oxides or $FeO_2$ in a proportion of 0 to 10% by weight as catalyst.

3. The paving stone (1) according to any of claims 1 and 2, wherein the first surface layer (2) of the stone (1) comprises zeolite in a proportion of 0 to 10% by weight.

4. The paving stone (1) according to any of claims 1 to 3, wherein the recycled materials in the surface layer (2) comprise glass, ceramic particles and concrete.

5. The paving stone (1) according to any of claims 1 to 3, wherein the recycled materials in the surface layer (2) comprise rubber material.

6. The paving stone (1) according to claim 4, wherein the glass is comprised in a range between 1% and 15% by weight with respect to the total weight of the surface layer, and more preferably between 1.5% and 12% by weight.

7. The paving stone (1) according to any of claims 1 to 3, wherein the base layer (3) has a thickness between 10 mm and 150 mm, more preferably between 38 mm and 68 mm.

8. The paving stone (1) according to any of claims 1 to 3, wherein the recycled materials in the base layer comprise aggregate materials in a proportion comprised between 1% and 12% by weight with respect to the total weight of the base layer.

9. The paving stone (1) according to any of claims 1 to 3, wherein the base layer includes a water repellent that is comprised in a range between 0.15 and 0.30%, more preferably between 0.20 and 0.28% by weight.

10. The paving stone (1) according to any of claims 1 to 3, wherein the base layer (3) comprises a fluidizing additive which is comprised in a range between 0.15 and 0.30%, more preferably between 0.20 and 0.28% by weight.

11. The paving stone (1) according to any of claims 1 to 3, wherein the aggregate particles provided in the base layer (3) are in a proportion comprised between 1% and 65% by total weight of the dried batch.

12. The paving stone (1) according to any of claims 1-3 and 11, wherein the aggregate particles have a thickness of 0.1 to 5 mm in a proportion of between 1% and 47% by weight with respect to the total weight.

13. The paving stone (1) according to claim 12, wherein the aggregate particles have a thickness of 0.1 to 1 mm in a proportion of between 1% and 20% by weight with respect to the total weight.

14. The paving stone (1) according to any of claims 1 to 3, wherein the surface layer (2) includes pigments.

15. The paving stone (1) according to claim 14, wherein pigments consist of iron oxide.

16. A method for producing a paving stone according to claims 1 to 3, wherein it comprises a first stage of pouring in a viscous mixture into a mould and later a second pouring stage of a second viscous mixture overlapping the first one in said mould, after which a vibrating and compacting stage of the mixture of both pourings is carried out and a later demoulding stage of the mixture in a semi-solid stage.

17. A method according to claim 16, wherein the compacting of the mixture of both pourings of mixture is carried out by a hydraulic cylinder.

18. A method according to claim 16, wherein each one of the first and second mixtures is carried out by a corresponding cement mixer.

19. A method according to claim 16, wherein the vibration is carried out by means of an electrical vibrating device.

\* \* \* \* \*